July 30, 1935.  R. G. SHERWOOD  2,009,748

METHOD OF AND MEANS FOR HEAT TREATING GLASS ARTICLES

Filed May 26, 1933

INVENTOR.
ROBERT G. SHERWOOD
BY Dorsey & Cole
ATTORNEYS.

Patented July 30, 1935

2,009,748

UNITED STATES PATENT OFFICE 2,009,748

METHOD OF AND MEANS FOR HEAT TREATING GLASS ARTICLES

Robert G. Sherwood, Corning, N. Y., assignor to Corning Glass Works, Corning, N. Y., a corporation of New York Application May 26, 1933, Serial No. 673,094

6 Claims. (Cl. 49—45)

This invention relates to a method of heat treating glass articles for the purpose of tempering or annealing them. Tempering of glass articles is accomplished by rapid cooling and creates compressional stresses in the surface layers of the glass together with the confinement of the accompanying tensional stresses to the interior of the glass. On the other hand, annealing of glass articles depends upon the elimination of stresses or the reduction thereof to a negligible amount.

Prior methods of heating for the purposes stated have, as far as known to me, involved the uniform heating of the article to a temperature above the strain point. This temperature in tempering is in certain cases carried much above such point to accentuate the effects of tempering. In annealing the temperature is not raised as high but the heat treatment is prolonged, and causes the release of the so-called permanent stresses which had been left in the glass by previous cooling. The article is then cooled at such a rate that the new stresses resulting therefrom will be small or large as desired. If the resulting average permanent stress is small the article is considered to be annealed. If the surface compressional stress is large and substantially uniform the article is "tempered" and strengthened through the toughening of its surface layers. This uniform heating has in the prior art been followed by uniform cooling of the article, or where a non-uniform strain pattern is desired, by non-uniform cooling of the article.

The prior method of effecting the heating of glass for the stated purposes has aimed at a regulation only of a primary source of heat, such as a flame or an electric resistance element, and has neglected the conditions of intermediate elements, such as the walls of a muffle or chamber which is heated from the outside by the primary source and transmits the heat to the interior of the chamber.

Prior methods of cooling glass articles have failed to give accurate control of the final stress condition because they have failed to overcome the difficulty due to the tendency of the edge or rim of the article to cool more rapidly than portions remote from the edge. This differential cooling is due to the fact that at the edge of a glass article the surface area per unit volume of glass is much greater than at a point remote from the edge. The result has been failure to attain proper control of stresses near the edges of the article in the cooling operations.

It is the object of this invention to control the production and distribution of permanent stress in glass articles by control of the heating thereof, as I have found that the desired control of stress can be best obtained by non-uniform heating of the glass followed by cooling under uniform conditions.

The above and other objects may be attained by practicing my invention which embodies among its features heating a glass article by radiant heat in a controlled, non-uniform manner to establish predetermined temperature gradients in a direction parallel with the surface thereof and subjecting the article to uniform cooling conditions.

My invention further resides in the novel construction, combination, and arrangement of parts to be more fully described herein, claimed in the appended claims, and illustrated in the accompanying drawing, in which:

In prior methods the glass article is heated to a predetermined uniform temperature and is then cooled. Prior tempering methods do not prevent the uneven stresses caused by the naturally more rapid cooling of the edges. I have discovered that by heating a glass article in a non-uniform manner so as to establish a temperature gradient between the edge and the portion remote from the edge and then subjecting it to uniform cooling conditions, preferably in a chamber whose temperature can be maintained substantially uniform throughout and varied as desired, the tendency of the edges to cool more rapidly can be compensated and the uneven stresses attendant thereon can thus be eliminated.

Figure 1:
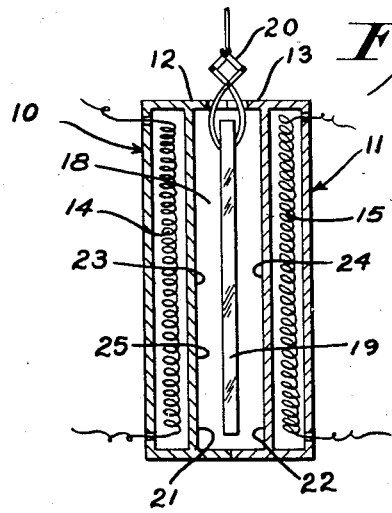
Fig. 1 is a vertical sectional view of a device for heating glass sheets in accordance with my invention.

For example, in Fig. 1 I have shown a device constructed in accordance with my invention for heating glass sheets in a non-uniform manner. The device comprises radiating elements 10 and 11 which are formed of cast iron or other suitable heat conducting material and which have projecting flanges 12 and 13 around their edges. These elements are provided with suitable heating means which in the present case comprise electric resistance elements 14 and 15 disposed behind the faces thereof and which are adapted to heat the faces of the radiating elements in a uniform manner. The radiating elements may be hinged or slidably mounted to permit their being separated or brought together and when in the closed position as shown the flanges 12 and 13 butt together to form a chamber 16. A sheet of glass 19 is supported in the chamber 16 by any suitable means, as by tongs 20. The distance between the glass surface and the faces of the radiating elements should preferably be relatively small.

Figure 2:
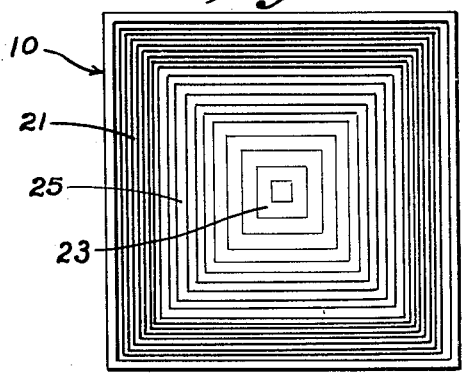
Fig. 2 is a front elevation of one of the radiating elements of Fig. 1 showing the face thereof in accordance with my invention.

In order to heat the glass sheet non-uniformly, that is, for example, to heat the edges to a higher degree than the center, the character of the faces of the elements 10 and 11 is made to vary from the centers to the borders thereof with respect to radiation coefficient, the centers having a lower coefficient than the borders. Regions 21 and 22 of the faces of the elements 10 and 11 which are adjacent the edges of the glass sheet are blackened or otherwise rendered heat radiating. Portions 23 and 24 of the surfaces of the elements which are adjacent the central portion of the glass sheet are polished or otherwise rendered less heat radiating. This is more clearly shown in Fig. 2 which, although it represents the face of the element 10, is also illustrative of the face of the element 11. In an area 25 between the regions 21 and 23 the radiating property of the surface varies progressively from the relatively high value of region 21 to the relatively low value of region 23. The surfaces which have the lower radiation coefficient may comprise a chromium plate or other suitably resistant surface of a variable degree of polish. The surfaces of higher radiation coefficient may consist of a coating of lamp black or graphite of a variable degree of density.

It will be noted that in my device the elements 10 and 11 constitute an intermediate source of heat and that heating of the glass is accomplished by means of the heat which is radiated therefrom. In addition, control of heat may be obtained by regulation of the temperature of the resistance elements 14 and 15 which in the present example constitute the primary source of heat. Glass absorbs a substantial amount of radiant energy and, being partially transparent thereto, such energy is absorbed practically simultaneously and uniformly throughout the body of the glass. Radiation heating therefore produces in glass a substantially uniform temperature between the surface and the interior, thus avoiding objectionable temperature gradients which are normal to the surface. For this reason, also, heating throughout the mass can be accomplished more rapidly by radiation heating than by conduction heating and the liability of breakage due to thermal shock will consequently be less.

To treat a glass sheet I heat the sheet by means of the above described apparatus in a non-uniform manner to a temperature above the strain point so as to establish predetermined temperature gradients in the glass and parallel with its surface in such a manner that upon subsequent free or natural cooling of the sheet either in air or in a uniformly heated chamber a uniform final stress condition is obtained which may be large or small as desired, depending upon the rapidity of cooling. For example, the resistance elements 14 and 15 (Fig. 1) are energized so as to heat the faces of the elements 10 and 11 uniformly to a temperature above the strain point of the glass which is to be treated and a sheet of glass is supported in the chamber 18. Alternatively, the glass sheet may be placed in position before the elements 10 and 11 are heated and the glass may be initially hot or cold. Since the areas 21 and 22 of the faces of the elements 10 have a higher coefficient of radiation than the areas 23 and 24, the areas 21 and 22 will radiate more heat and the edges of the glass sheet will become heated to a higher temperature than the central portion. Heating is continued until the central portion of the glass sheet has reached a temperature sufficiently above the strain point of the glass to permit any prior permanent strain to be relieved within a reasonable time. After the glass sheet has thus been heated to a non-uniform temperature above the strain point and the all previously existing strain substantially removed it is taken from the heating device and allowed to cool in the usual manner either in the air or in a uniformly heated chamber, depending upon the amount of residual strain desired. If the proper temperature gradient between the edges and central portion of the glass sheet has been established the residual strain will be uniform throughout the glass and may be large or small, depending upon the rapidity of cooling. Since the temperature gradient which will produce a uniform stress condition on cooling and since the cooling rate necessary to establish the desired amount of stress will vary with conditions such as thickness of the glass sheet and the expansion coefficient and other physical properties depending upon the composition of the glass, it will be obvious that the variation in radiation coefficient of the radiating faces which is necessary for the heating of all sheets of glass cannot be stated. However, the proper variation for any given sheet of glass can readily be determined by trial.

Figure 3:
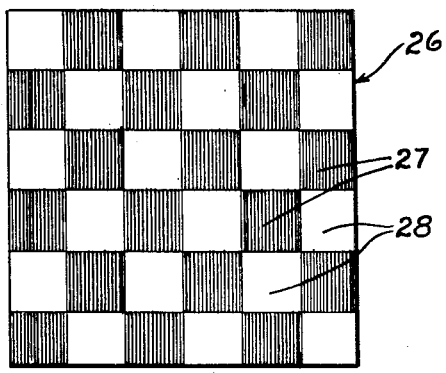
Fig. 3 is a front elevation of a modified radiating element made in accordance with my invention.

If it is desired to produce in a glass sheet a predetermined non-uniform strain pattern by forming a corresponding pattern of compressional stresses in the surface of the article the variable radiating portions of the elements can easily be arranged in the proper sequence and with the proper difference in radiation cofficients to obtain this result. It may also be desirable to have the strained areas of the glass more or less sharply outlined in order to intensify those properties which are associated with stress. Such a distribution of stress may be obtained by varying more or less abruptly the coefficient of radiation of the various regions of the surfaces of the radiating elements from relatively high radiation to relatively low radiation. In Fig. 3 I have shown a radiating element 26 the face of which bears on arbitrary design composed of highly radiating areas 27 and slightly radiating areas 28. It is to be understood that the design shown is purely arbitrary for the purpose of illustration and that this design may take any desired form.

Figure 4:
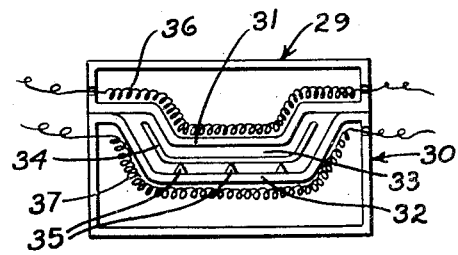
Fig. 4 is a vertical sectional view of a device for heating glass baking dishes in accordance with my invention.
Figure 5:
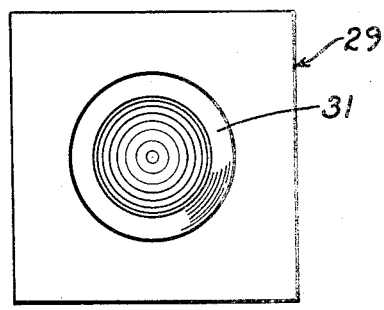
Fig. 5 is a plan view of the face of the upper radiating element of Fig. 4.
Figure 6:
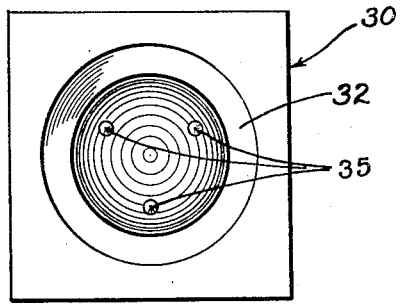
Fig. 6 is a plan view of the face of the lower radiating element of Fig. 4.

The method above described for the heating of glass sheets is likewise applicable to other glass articles such as baking dishes and the like and such articles can thereby be annealed so as to be free from the usual rim strain or they can be made to acquire a uniform or non-uniform compressional stress over the entire surface as desired in order to increase the mechanical and thermal strength or to give them definite breaking characteristics as the case may be. In Fig. 4 an upper radiating element 29 rests upon a lower radiating element 30 in such a manner that a truncated conical extension 31 of the element 29 projects into a corresponding cavity 32 of the element 30 to form a dish-shaped chamber 33. Within the chamber 33 a glass baking dish 34 rests upon pointed supports 35 of non-conducting material such as transite, fire clay, or the like, so that the dish 34 is not in contact with the walls of the chamber 33. The elements 29 and 30 are provided with suitable heating means which in the present case comprise electric resistance elements 36 and 37 disposed behind the faces thereof and adapted to heat the faces of the elements 29 and 30 in a uniform manner. The elements 29 and 30 may be hinged or mounted in any suitable manner to facilitate their being separated or brought into closed relation. As in the case of the elements 10 and 11 shown in Figs. 2 and 3, the faces of the elements 29 and 30 have a varying coefficient of radiation. In order to treat the dish 34 so that it will have a uniform stress or freedom therefrom it will be obvious in view of the foregoing that those portions of the faces of the radiating elements 29 and 30 which are adjacent the rim of the dish 34 must have a higher coefficient of radiation than the portions which are remote from the rim and that the remote portions must have a relatively lower coefficient of radiation. This is illustrated in Figs. 5 and 6 where the shaded area in the peripheral regions of the radiating faces indicate regions of relatively high radiation coefficient. The regions of relatively high and low radiation can also be arranged in any suitable manner to produce any desired strain pattern as is illustrated in Fig. 3. As pointed out above, the difference in coefficient of radiation of the various regions of the radiating faces which is necessary for the proper heating of all glass articles can not be stated since this will vary with conditions but for any given glass it may readily be determined by trial.

While in the foregoing there has been shown and described the preferred embodiment of my invention, it is to be understood that minor changes in the details of construction, combination and arrangement of parts may be resorted to without departing from the spirit and scope of the invention as claimed.

What I claim is:

1. In an apparatus for heating glass articles to be subsequently cooled, the combination of a heating means and a radiating element intermediate of the glass and the heating means, the face of which opposite the glass varies progressively in selected areas from a relatively high radiating coefficient to a relatively low radiating coefficient.

2. In an apparatus for heating glass articles to be subsequently cooled, the combination of a heating means and a radiating element intermediate of the glass and the heating means, the face of which adjacent to the glass is blackened in selected areas and polished in other areas, the degree of blackening of the blackened areas decreasing towards adjacent polished areas.

3. The method of heat treating a glass article which includes heating the article non-uniformly to a temperature between the strain point and softening point of the glass to establish suitable temperature gradients therein parallel to the surface of the article and subjecting the article to uniform cooling conditions.

4. The method of heat treating a glass article which includes heating the edges of the article to a temperature below the softening point but above the temperature of the central portion of the article, said central portion being heated to a temperature above the strain point of the glass and subjecting the article to uniform cooling conditions.

5. The method of heat treating a glass article which includes supporting the article between heat radiating elements, the faces of which have a varying coefficient of radiation, supplying heat to the radiating elements to heat the article by means of the radiated heat to establish suitable temperature gradients in the article, the minimum temperature being above the strain point of the glass, removing the article from between the radiating elements and subjecting the article to uniform cooling conditions.

6. The method of heat treating a glass article which includes supporting the article between heated radiating elements, radiating heat from the elements into the central portion of the article to raise the temperature of the central portion above the strain point of the glass, radiating sufficient heat from the elements into the edges of the article to raise the edges to a temperature higher than the central portion, removing the article from between the elements and subjecting it to uniform cooling conditions.

ROBERT G. SHERWOOD.